Nov. 20, 1951      W. A. THORNE      2,575,933
DETACHABLE VISOR FOR AUTOMOBILES

Filed Sept. 7, 1948      2 SHEETS—SHEET 1

INVENTOR.
Wroten A. Thorne
BY
ATTORNEY.

Nov. 20, 1951  W. A. THORNE  2,575,933
DETACHABLE VISOR FOR AUTOMOBILES
Filed Sept. 7, 1948  2 SHEETS—SHEET 2
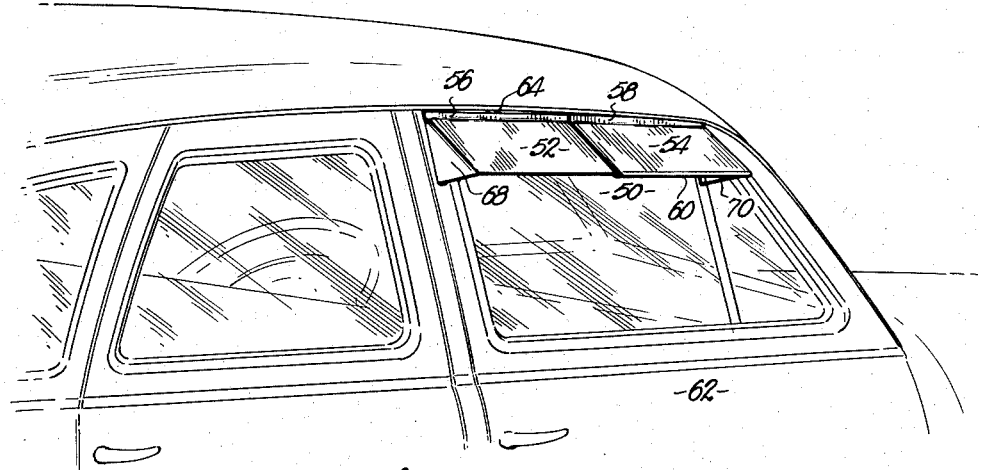
Fig. 6.
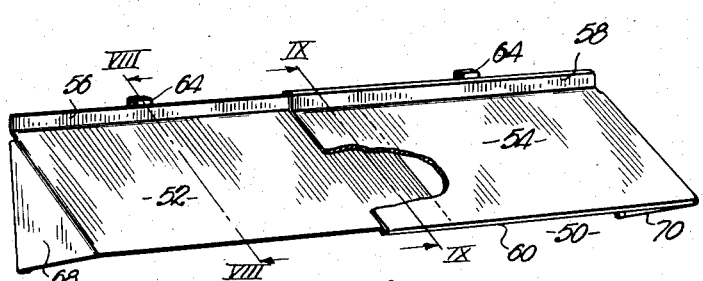
Fig. 7.
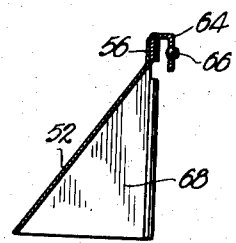
Fig. 8.
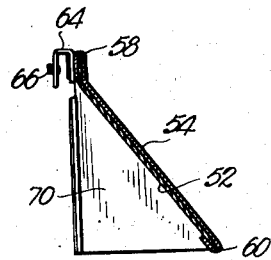
Fig. 9.
INVENTOR.
Wroten A. Thorne
BY
ATTORNEY.

Patented Nov. 20, 1951

2,575,933

UNITED STATES PATENT OFFICE 2,575,933

DETACHABLE VISOR FOR AUTOMOBILES

Wroten A. Thorne, Eastwood Hills, Mo.

Application September 7, 1948, Serial No. 48,052

1 Claim. (Cl. 296—44)

This invention relates to automobile accessories and more particularly to a device readily attachable to an automobile door for easy removal as desired and capable of presenting a visor or awning for such door to not only at least partially shade the automobile occupant but to permit opening of the window forming a part of the door without the disadvantage of wind and/or rain reaching the occupant directly.

The most important object of this invention is to provide a detachable visor for automobile doors having an elongated, angularly-disposed panel provided with hook means adjacent the normally uppermost longitudinal edge thereof permitting attachment to the door without the necessity of in any way mutilating any part of the automobile.

Another object of this invention is to provide a visor of the aforesaid character having a pair of relatively telescoped panel sections, whereby the visor may be universally used on automobile doors of differing sizes.

Another important object of this invention is to provide a visor having at least one hook that is U-shaped in cross section for looping over the uppermost edge of the door, together with an end wall also provided with such loop, all of the attaching means being provided with set screws to clamp the visor in place, thereby eliminating damage to the door by virtue of the fastening operation.

Other objects relating to details of construction and formation to accommodate doors of differing contours will be made clear or become apparent as the following specification progresses, reference being had to the accompanying drawing, wherein:

Fig. 6 is a perspective view of another form of my present invention, showing the same operably mounted upon a door of an automobile.

Fig. 7 is a perspective view of the visor shown in Fig. 6 entirely removed from association with an automobile door, parts being broken away to reveal details of construction.

Fig. 8 is a transverse cross-sectional view taken on line VIII—VIII of Fig. 7, looking in the direction of the arrows; and, Fig. 9 is a transverse cross-sectional view taken on line IX—IX of Fig. 7.

Figure 1:
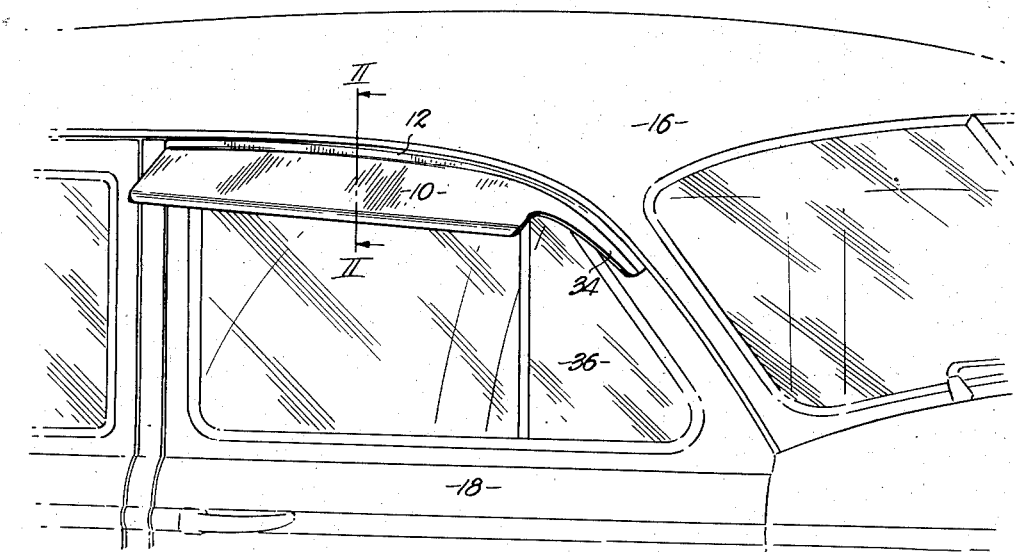
Fig. 1 is a perspective view of a detachable visor for automobiles, embodying one form of the present invention, showing the same operably mounted upon one door of an automobile.

The visor forming the modification illustrated in Figs. 1 to 4, inclusive, includes an elongated panel broadly designated by the numeral 10 having a laterally-extending normally vertical flange 12 integral with one longitudinal edge of panel 10 and co-extensive in length therewith. Flange 12 forms one leg of a hook broadly designated by the numeral 14 and extending the entire length of the normally uppermost edge of panel 10.

Automobiles, such as illustrated at 16, of the present day type, are provided with doors 18 having an upturned flange 20 along the uppermost edge thereof and adjacent the outermost face of door 18. This flange 20 usually extends downwardly as at 22 along the vertical sides of the door 18. The hook 14 is U-shaped in cross section, as is clearly illustrated in Fig. 2 of the drawing, and is thus adaptable to be looped over said uppermost edge 20 of door 18 with panel 10 extending outwardly therefrom and downwardly at an angle clearly illustrated in the drawings.

Figure 2:
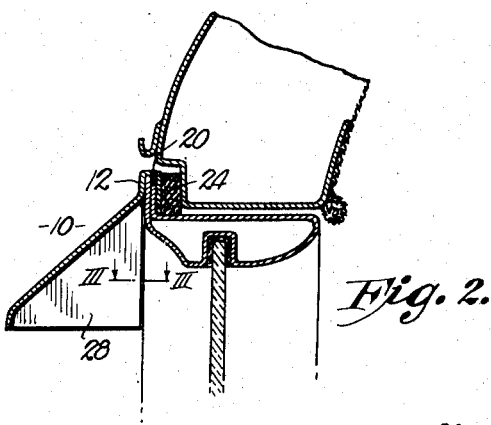
Fig. 2 is a transverse cross-sectional view through the visor, taken on line II—II of Fig. 1, looking in the direction of the arrows.

A weather seal 24, also, forming a part of the door, is disposed along the innermost face of the upturned flange 20 thereof, and the innermost leg of the U-shaped hook 14 is inserted, as shown in Fig. 2, between the strip of material 24 and the proximal face of the flange 20. A plurality of set screws 26 pass through said innermost leg of the hook 14 and, when the latter is looped over edge 20 of door 18, driving of set screws 26 inwardly against flange 20 draws the flange 12 tightly against door 18 to hold the entire assembly in place.

Ordinarily, the weather seal 24 is sufficiently flexible and pliable to permit positioning of the hook 14 and of set screws 26 without damaging or materially effecting the strip 24 in any way.

One end of the visor assembly is provided with a wall 28 that spans the distance between panel 10 and door 18 of automobile 16. This wall 28 is substantially triangular shaped and has one edge thereof secured directly to the proximal end of panel 10.

Figure 3:
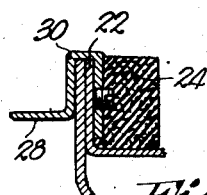
Fig. 3 is a cross-sectional view taken on line III—III of Fig. 2.
Figure 4:
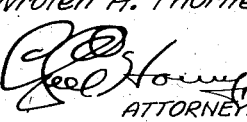
Fig. 4 is an inside perspective view showing the visor illustrated in Figs. 1 to 3, inclusive.

The normally lowermost edge of wall 28 is normally substantially horizontal, and the third edge of wall 28 is provided with a hook 30 formed in substantially the same manner as hook 14. This hook 30, as shown in Fig. 3, is also U-shaped in cross section and is looped over the flange portion 22 of door 18. A set screw 32 clamps the hook 30 in place.

That end of the panel 10 opposite to the wall 28 is provided with an arcuate, elongated finger 34 having a width that is less than the overall width of the panel 10 and is formed to overlie that portion of door 18 having triangular-shaped vanes 36 as a part thereof. These vanes are of conventional character and formed to swing outwardly with respect to door 18 on a vertical axis.

Finger 34 is formed to permit unrestricted opening of vane 36 and, accordingly, is inclined outwardly and downwardly from door 18 at a much lesser angle than the main body portion of panel 10. Finger 34 is, also, arched longitudinally to conform to that part of door 18 next adjacent thereto.

It is clear from the foregoing that the entire assembly just described has been formed for a particular type of automobile door and, obviously, the shape, contour and angular disposition of finger 34 will be varied according to the particular door 18 upon which the device is to be mounted.

In some cases, it may be desirable to entirely eliminate finger 34, as shown in the modification in Figs. 6 to 9, inclusive, about to be described.

Figure 5:
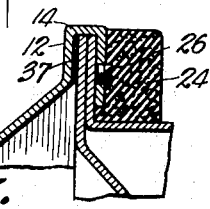
Fig. 5 is an enlarged cross-sectional view, similar to that shown in Fig. 2, showing a slightly modified form of the visor.

Fig. 5 of the drawing shows an automobile visor made precisely as just described with respect to the form of Figs. 1 to 4, inclusive, with the exception only that a resilient strip of material 37 is interposed between the flange portion 12 of hook 14 and the proximal outermost face of automobile door 18 for purposes of preventing any marring effect upon door 18 and further to yieldably hold the hook 14 in place, thereby cooperating with set screws 26 in eliminating rattling. This strip 36 may well be continued into the hook 30 of end wall 28, if desired.

In Figs. 6 to 9, inclusive, there is shown a panel, broadly designated by the numeral 50, that includes a pair of flat sections 52 and 54. The normally uppermost longitudinal edge of the section 52 of panel 50 is provided with an upturned, normally vertical flange 56 co-extensive in length with said section 52.

The section 54 has formed on its uppermost longitudinal edge a panel 58 that is U-shaped in cross section, as shown in Fig. 9, for telescopingly receiving the flange 56 of section 52. The lowermost longitudinal edge of panel section 54 is rebent upon itself as at 60 to slidably receive the lowermost edge of panel section 52. Accordingly, the panel 50 is extensible by sliding section 52 within section 54 to accommodate automobile doors 62 of differing widths.

Each of the sections 52 and 54 is provided with a U-shaped hook 64 of identical character and having one leg thereof welded or otherwise rigidly fixed to the respective section 52 or 54. In the case of section 52, hook 64 is joined to the normally innermost face of the flange 56, whereas, in the case of section 54, such hook 64 joins with the innermost leg of the U-shaped channel member 58.

Hooks 64 are looped over the uppermost edge of door 62 in the same manner as above described with respect to the modification of Figs. 1 to 4, inclusive. Each hook 64 is provided with a set screw 66 that serves to hold the entire device in place. The outermost free ends of the two sections 52 and 54 of panel 50 are provided with a triangular-shaped wall 68 and 70, respectively, that is secured directly to the proximal end of the respective panel sections and spans the distance between panel 50 and door 62.

In all the modifications, it is clear that the detachable visor has connection with the automobile only by joinder with the door thereof and is swingable with such door as a unit as the latter is opened and closed. When mounted as above specified, the device becomes a permanent fixture and is always present to deflect rainfall, thereby permitting at least partial opening of the door window and, also, offers some resistance to strong winds and improper ventilation.

The device can be made from relatively rigid material, easily and at a relatively small cost, and can, also, be dressed up to add to the appearance of the automobile, rather than detract therefrom; and, perhaps more important is the fact that the visor is detachable and, when removed, the automobile will remain as attractive as before, since the same need not be mutilated through use of the device.

Since, as above mentioned, the shape and contour of the visor must, to some extent, depend upon the automobile with which it is to be used, it is manifest that many changes and modifications might be made within the scope of this invention without departing from the appended claim.

Having thus described my invention, what I claim as new and desire to secure by Letters Patent is:

For an automobile door having an outwardly swinging window vane and a flange extending upwardly along the uppermost edge thereof and laterally along the forwardmost and rearmost edges thereof, a visor comprising an elongated, transversely inclined, flat panel; an elongated, transversely vertical valance strip depending from the lowermost, longitudinal edge of the panel and integral therewith; a triangular end wall integral with the panel and said strip at one end thereof, the opposite end of the panel and the strip being cut away to clear said window vane when the latter is opened, presenting an elongated, transversely inclined and longitudinally arched finger extending outwardly from said opposite end of the panel and downwardly from the uppermost edge of the panel; a U-shaped channel member coextensive with the length of the panel and the finger at the uppermost edges thereof and integral therewith, said channel member being adapted for looping over said flange at the uppermost and forwardmost edges of said door; a vertical, U-shaped channel member integral with the end wall and adapted for looping over said flange at the rearmost edge of the door; and a plurality of set screws on the innermost leg of said channel members and adapted to bear against the inner face of the flange to draw the other leg of the channel members tightly against the outer face of the flange.

WROTEN A. THORNE.

REFERENCES CITED

The following references are of record in the file of this patent:

UNITED STATES PATENTS

| Number | Name | Date |
|---|---|---|
| 1,683,260 | Polk | Sept. 4, 1928 |
| 1,709,491 | Runge | Apr. 16, 1929 |
| 1,741,202 | Roth | Dec. 31, 1929 |
| 1,745,866 | Pritchard | Feb. 4, 1930 |
| 2,031,404 | Biggs | Feb. 18, 1936 |
| 2,034,342 | Hay | Mar. 17, 1936 |
| 2,108,322 | Thorp | Feb. 15, 1938 |
| 2,350,297 | Vesta | May 30, 1944 |